(12) United States Patent
Wada et al.

(10) Patent No.: US 10,148,924 B2
(45) Date of Patent: Dec. 4, 2018

(54) PROJECTION APPARATUS, METHOD OF CONTROLLING PROJECTION APPARATUS, AND PROJECTION SYSTEM

(71) Applicant: CANON KABUSHIKI KAISHA, Tokyo (JP)

(72) Inventors: Hidetoshi Wada, Yokohama (JP); Azusa Koike, Kawasaki (JP); Michihisa Yanagi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/491,469

(22) Filed: Apr. 19, 2017

(65) Prior Publication Data

US 2017/0310937 A1  Oct. 26, 2017

(30) Foreign Application Priority Data

Apr. 25, 2016 (JP) ................. 2016-087384

(51) Int. Cl.
*H04N 5/66* (2006.01)
*H04N 9/31* (2006.01)
*G06T 5/50* (2006.01)
*G02F 1/137* (2006.01)

(52) U.S. Cl.
CPC ............ *H04N 9/3185* (2013.01); *G06T 5/50* (2013.01); *H04N 9/3123* (2013.01); *H04N 9/3147* (2013.01); *H04N 9/3179* (2013.01); *H04N 9/3182* (2013.01); *G02F 1/137* (2013.01); *G06T 2207/20192* (2013.01); *H04N 9/3155* (2013.01)

(58) Field of Classification Search
CPC .. H04N 9/3185; H04N 9/3123; H04N 9/3147; H04N 9/3179; H04N 9/3182; H04N 9/3155
See application file for complete search history.

(56) References Cited

U.S. PATENT DOCUMENTS

| | | | | |
|---|---|---|---|---|
| 6,205,259 | B1 * | 3/2001 | Komiya | G06T 5/50 382/284 |
| 6,481,175 | B2 * | 11/2002 | Potter | E04B 1/26 52/481.1 |
| 6,753,923 | B2 * | 6/2004 | Gyoten | H04N 9/3147 348/383 |

(Continued)

FOREIGN PATENT DOCUMENTS

JP  2013-050679 A  3/2013

*Primary Examiner* — Jefferey F Harold
*Assistant Examiner* — Humam M Satti
(74) *Attorney, Agent, or Firm* — Fitzpatrick, Cella, Harper & Scinto

(57) ABSTRACT

Each projection apparatus in a multi-projection system has a liquid crystal panel, a driving circuit configured to perform PWM control of the liquid crystal panel, and a projection image processing unit configured to perform edge blending processing to perform compositing display by each projection apparatus and processing to change gain properties of the edge blending processing by each projection apparatus. Synchronization of each projection apparatus is maintained by a synchronization circuit. Therefore, a sum of image gain in a region of image compositing by each projection apparatus is 1, and the position and image gain properties of the compositing region are changed for each frame, so the position of image deterioration changes for each frame.

10 Claims, 13 Drawing Sheets

(56) References Cited

U.S. PATENT DOCUMENTS

| | | | |
|---|---|---|---|
| 2002/0024612 A1* | 2/2002 | Gyoten | H04N 9/3147 348/383 |
| 2005/0140568 A1* | 6/2005 | Inazumi | H04N 9/3147 345/1.3 |
| 2007/0103652 A1* | 5/2007 | Nijim | G03B 37/04 353/94 |
| 2008/0259223 A1* | 10/2008 | Read | H04N 9/3147 348/745 |
| 2009/0066723 A1* | 3/2009 | Saito | H04N 9/3147 345/629 |
| 2013/0050286 A1 | 2/2013 | Yoshinaga et al. | |
| 2016/0112689 A1* | 4/2016 | Okamoto | H04N 9/3147 348/745 |

* cited by examiner

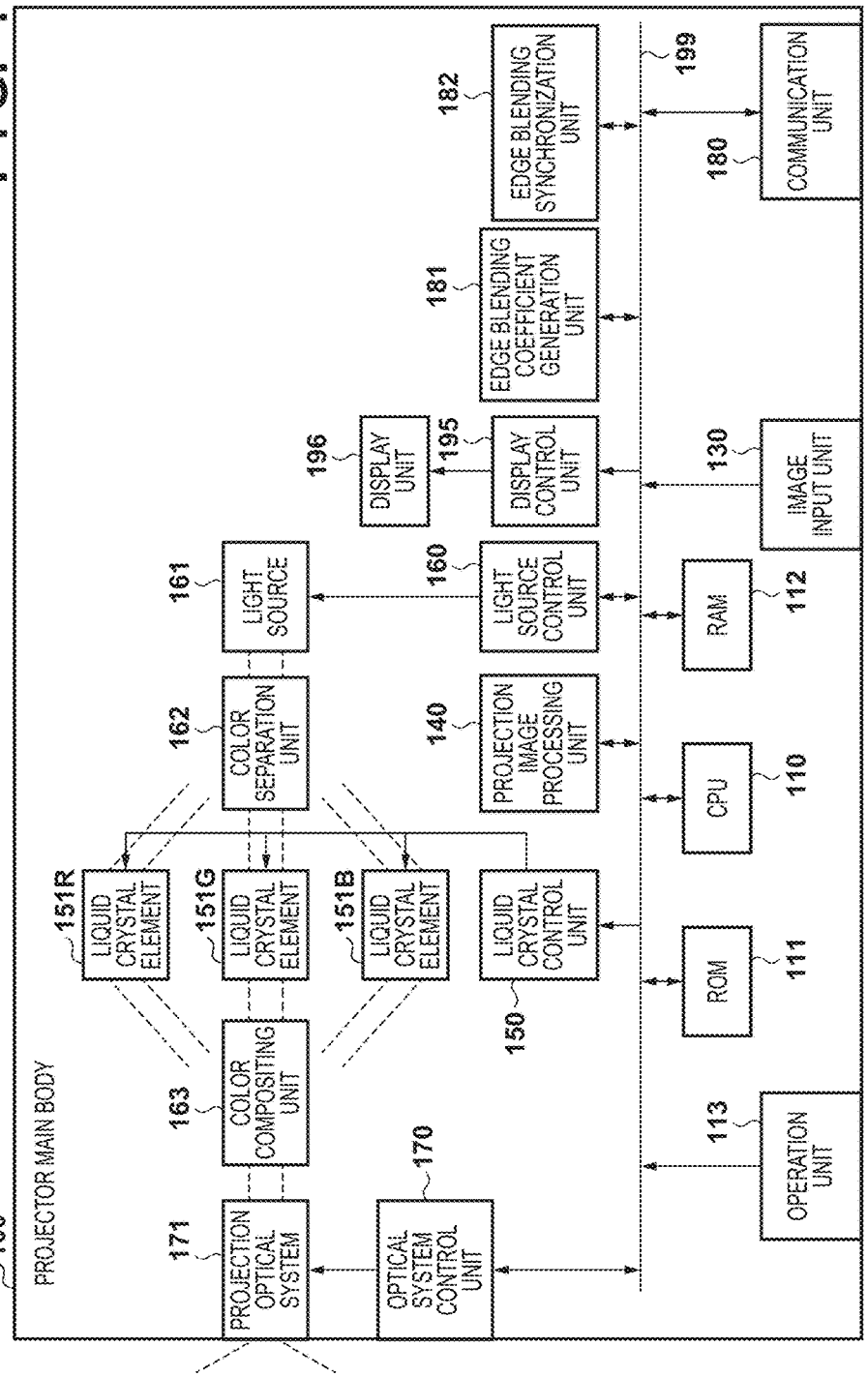

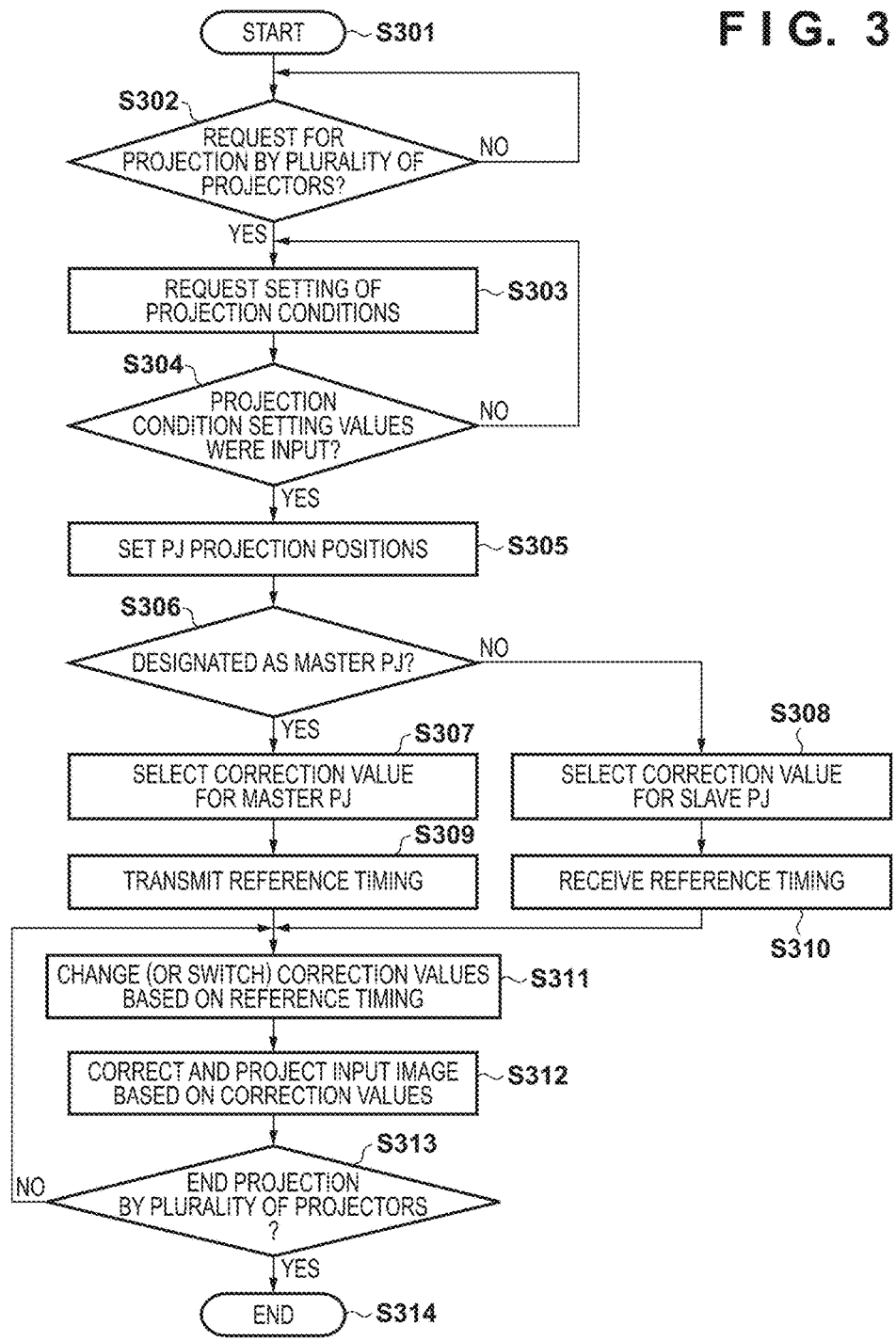

F I G. 4A
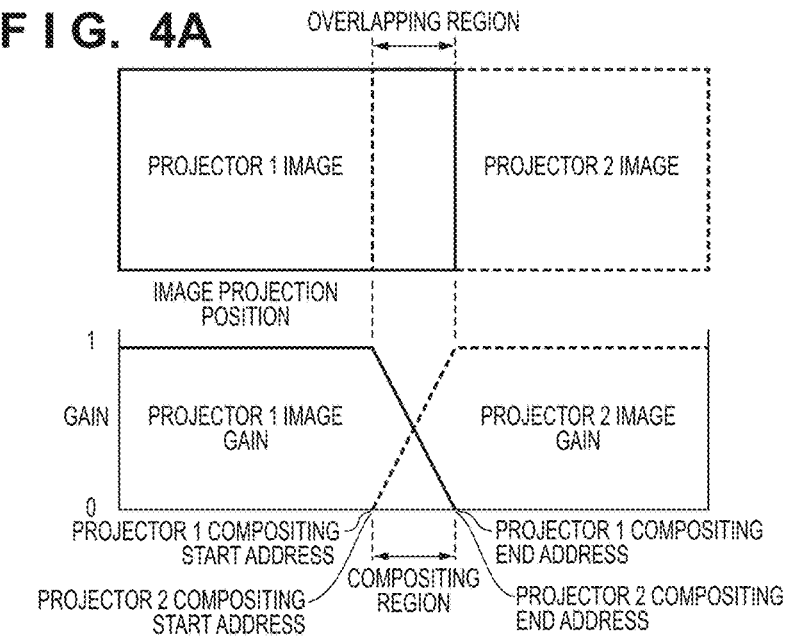
F I G. 4B
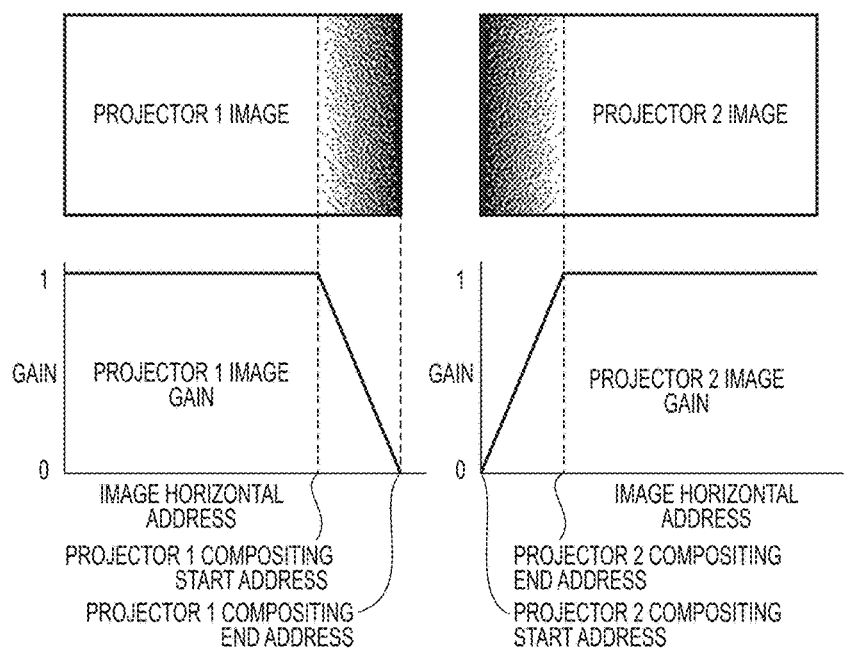

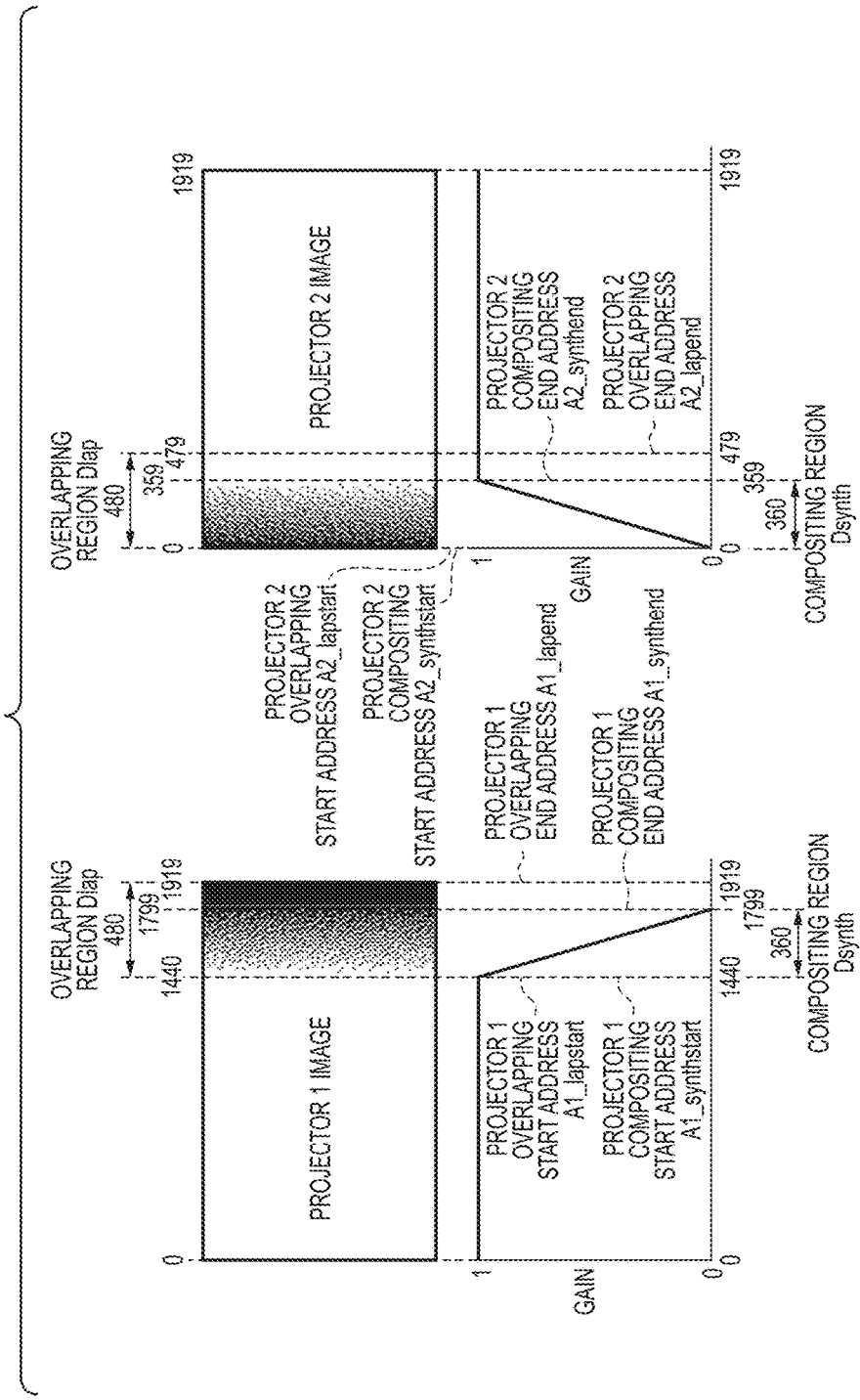

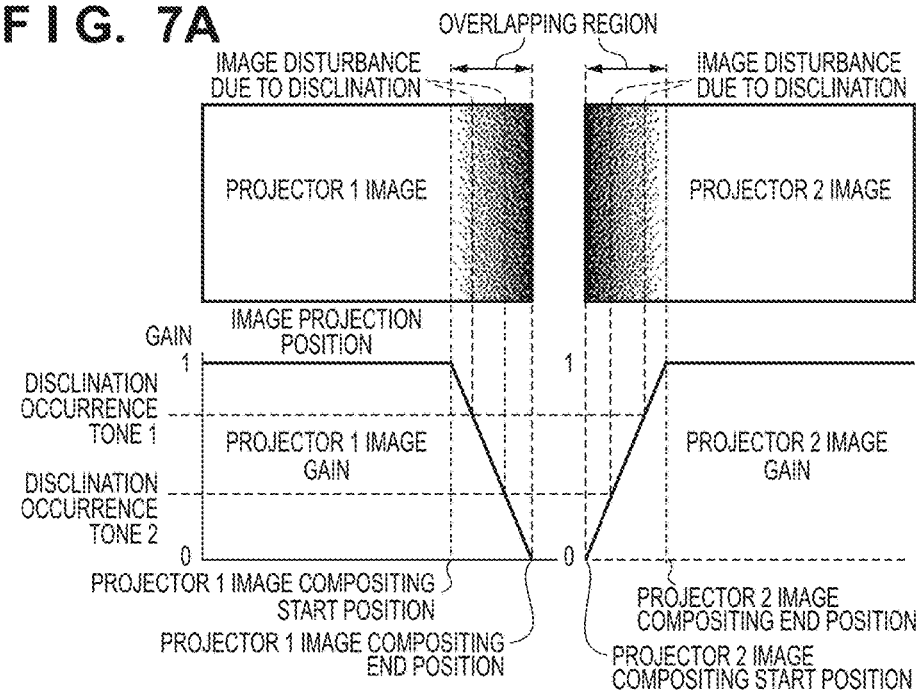
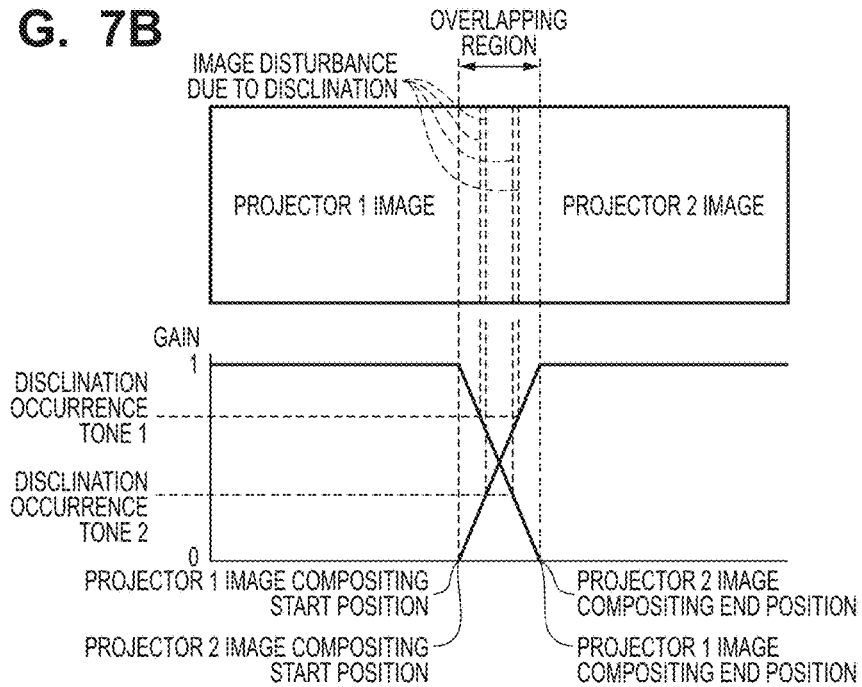

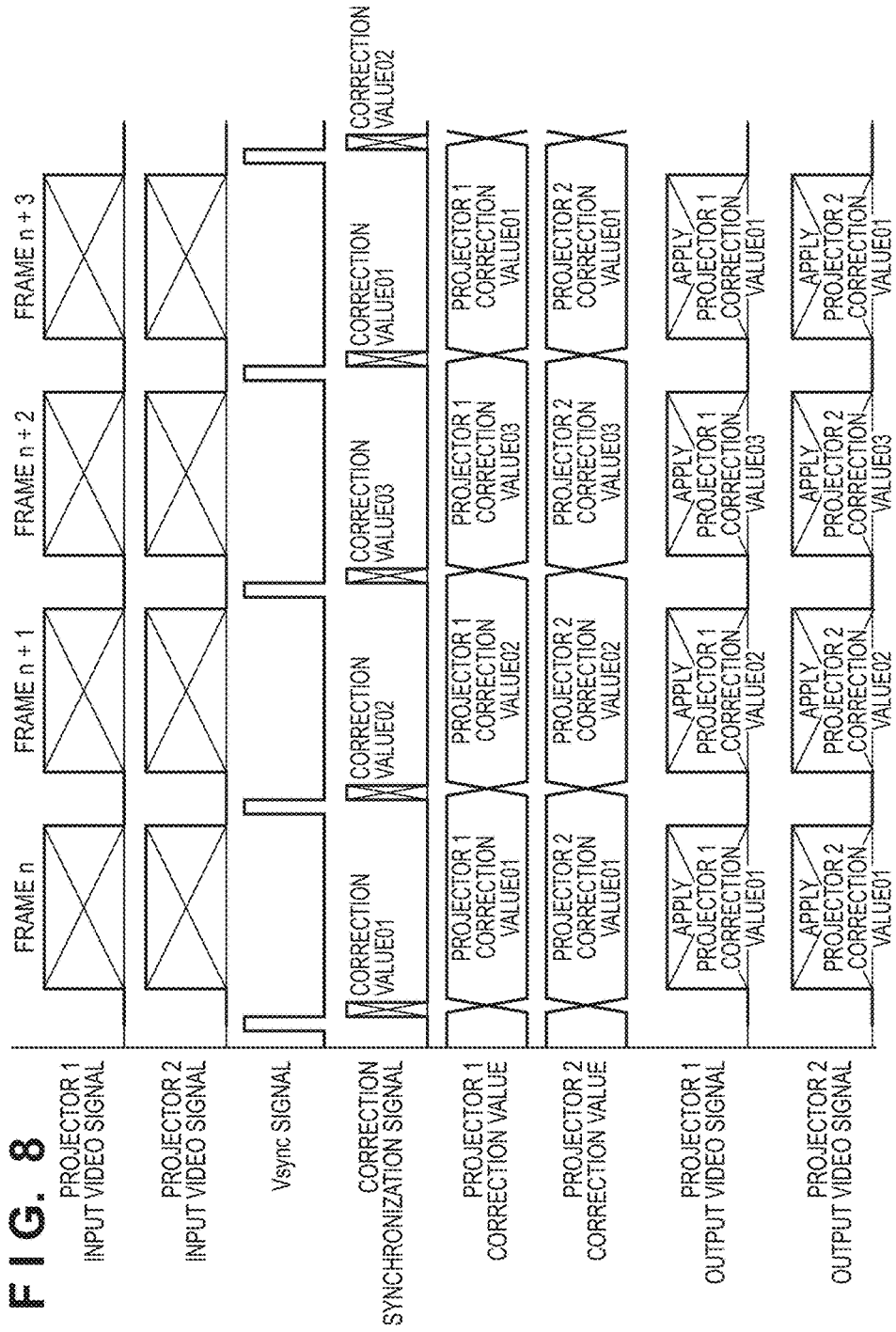

PROJECTION APPARATUS, METHOD OF CONTROLLING PROJECTION APPARATUS, AND PROJECTION SYSTEM

BACKGROUND OF THE INVENTION

Field of the Invention

The present invention relates to a projection apparatus, a method of controlling the projection apparatus, and a projection system employing a plurality of projection apparatuses.

Description of the Related Art

There are projection apparatuses that form an image on a light valve of a liquid crystal panel or the like, and display the image in an optically enlarged projection. Recently, the resolution of video sources has increased, and it is desired to display images having a large number of pixels, such as 4K2K or 8K4K images for example, on a large screen. Commonly, in order to increase the number of pixels and increase the screen size of a projector, it is necessary to miniaturize light valves of a liquid crystal panel or the like, and adopt a high-brightness light source, so cost increases. Therefore, many-pixel, large-screen projection display is often performed by multi-projection using a plurality of inexpensive projectors having a conventional light valve and light source. Multi-projection is a method of arranging projection screens to be projected by a plurality of projection apparatuses in a tile shape, and displaying one image as a whole. In the case of multi-projection, a process called "edge blending" is used that enables the joint between projection screens projected by each projecting apparatus to be inconspicuous. Edge blending is processing in which a portion of adjacent images of each projection screen are overlapped, and in order to maintain uniform illuminance within the projection screens, such that the total illuminance of the overlapped portion where a plurality of projection screens have been overlapped is equal to the illuminance of a non-overlapped portion, light reduction processing (referred to below as "gradation processing") is performed on the overlapped portion.

On the other hand, as a problem characteristic of liquid crystal panels, there is alignment abnormality due to a horizontal electric field from adjacent pixels (referred to below as "disclination"). This is not a problem limited to a PWM driving scheme, but is a phenomenon expressed by the amount of light emitted from a target pixel decreasing due to being affected by the horizontal electric field of the adjacent pixel, so that the amount of light emitted from the target pixel is less than the gradation originally desired to be displayed. In an analog driving scheme in which video is expressed by applying a voltage proportional to a gradation value to liquid crystal, as a gradation difference between a target pixel and an adjacent pixel increases, an applied voltage difference of the pixel increases. Therefore, the effect of the horizontal electric field increases, disclination occurs strongly, and image quality is disturbed and is visually recognized.

On the other hand, disclination in a PWM driving scheme that expresses gradation with binary values ON/OFF will be described in detail with FIGS. 2A and 2B serving as examples. FIGS. 2A and 2B show gradation expression in a liquid crystal panel employing a PWM driving scheme. As shown in FIG. 2A, in this example, a period of one frame, which is a time period for expressing gradation, is divided into four subfields of different time periods, and by changing (or switching) ON/OFF of each period, gradation is expressed with temporal integration. In a line with a gradation value of 0, a period during one frame is always an OFF period, and in a line with a gradation value of 15, a period during one frame is always an ON period. In periods of gradation values 1 to 14, there are ON periods and OFF periods among subframe periods obtained by dividing the period of one frame. FIG. 2B shows, in the lines of FIG. 2A, a projection image when an image is actually projected by the liquid crystal panel, and here it is understood that a line having a gradation value of 0 represents black, a line having a gradation value of 15 represents white, and lines having gradation values from 0 to 15 represent gradations.

Here, when one of two adjacent pixels is ON while the other is OFF, a horizontal electric field occurs, and in the ON pixel, a black region is formed in a part of a region adjacent to the adjacent OFF pixel, and as a result the illuminance of the ON pixel decreases. This is image quality disturbance due to disclination. For example, in lines having a gradation value of 7 and a gradation value of 8 in FIG. 2A, it is understood that in the entire period of one frame, one of these lines is ON while the other is OFF. There is also a similar ON/OFF relationship between the gradation 3 and the gradation 4, and between the gradation 11 and the gradation 12, but in those cases the time period in which one line is ON while the other line is OFF is shorter. Here, three black streaks are shown in FIG. 2B, and this indicates that in the above-described three locations, the gradation is darker than the original gradation due to disclination. Note that because the time period of the two subfields in the first half of the frame are short, the effect of disclination is unlikely to be conspicuous. That is, it is not the difference in gradation values between adjacent pixels, but rather, as the period during which the PWM pattern is ON/OFF between adjacent pixels increases, the degree of disturbance of disclination increases, that is, the degree of image quality deterioration increases. In other words, disclination is particularly likely to be visually recognized in a gradation image with a small gradation difference between adjacent pixels.

Regarding this image quality disturbance due to disclination characteristic to PWM driving, as described in Japanese Patent Laid-Open No. 2013-050679, a method is known in which correction values common to all pixels are added to gradation data, and the correction values are successively (or periodically) changed for each frame so that the position where disturbance occurs is moved at a time resolution that cannot be visually recognized.

However, in multi-projection, particularly when gradation processing by edge blending has been performed, there is a problem that disturbance due to disclination becomes easily visually recognized in an overlapping region.

FIGS. 7A and 7B show, when performing multi-projection, how disclination becomes easily visually recognized due to gradation processing in an overlapping region where edge blending is performed. Here, a white image is used for input. In FIG. 7A, a first projector projects a projector 1 image projected to the left, a second projector projects a projector 2 image projected to the right, and in an overlapping region, an image that has undergone gradation processing on an input video signal is projected. In the projector 1 image on the left side by the first projector, gain from a left end of the image to a projector 1 image compositing start position is set to 1, gain at a projector 1 image compositing end position that is the right end of the image is set to 0, and the gain from the projector 1 image compositing start position to the projector 1 image compositing end position is applied by linear interpolation. Also in the projector 2 image on the right side by the second projector, gain is set to 0 at a projector 2 image compositing start position and gain is set to 1 at a projector 2 image compositing end position, and the gain between those positions is applied by linear interpolation. As shown in FIG. 7B, when the overlapping regions of the images with each other are overlapped, when the size of the overlapping regions of the projector 1 image and the projector 2 image are the same, the gain of the gradation processing for each image at any position in the overlapping regions is added and becomes 1. In other words, it is possible to composite the projector 1 image and the projector 2 image without a brightness level difference between the overlapping regions.

Here, when the gain is smoothly changed by the gradation processing in the overlapping regions, as described with reference to FIGS. 2A and 2B, disclination occurs between certain gradations and is easily visually recognized. In FIG. 7A, gradation in the gain where disclination occurs is defined as a disclination occurrence gradation 1 and a disclination occurrence gradation 2. In the projector 1 image and the projector 2 image, vertical streaks, which are image quality disturbances due to disclination at the positions of the disclination occurrence gradation 1 and the disclination occurrence gradation 2, are shown. Here, when the overlapping regions are overlapped as shown in FIG. 7B, two black streaks of image quality disturbances due to disclination occur in each of the projector 1 image and the projector 2 image respectively, and remain occurring in the overlapping regions as a total of four black streaks.

The following three points are listed as main reasons that black streaks become easily visually recognized by this disclination.

The location of occurrence of image quality disturbance is fixed to a partial region, which is the overlapping region of the projection screen.

When projection images are multi-projected aligned horizontally, an overlapping region at the center of the screen is a region of interest for users.

Image quality disturbance occurs in an overlapping region even in the case of a pattern in which image quality disturbance due to disclination does not normally occur, for example such as in the case of a white solid image in which there is no gradation change.

In other words, in a multi-projection system configured with a projection apparatus using a PWM driving scheme and having a liquid crystal display element, there is the problem that edge blending technology does not enable the joint between screens to be inconspicuous, which is the essential aim of that technology.

SUMMARY OF THE INVENTION

Consequently, the present invention aims to provide, in a multi-projection system employing a projection apparatus using a PWM driving scheme and having a liquid crystal display element, a projection apparatus that does not cause an image quality disturbance due to disclination in an edge blending region to be visually recognized.

In order to attain such an aim, the present invention has the following configuration.

According to one aspect of the present invention, there is provided a first projection apparatus that together with a second projection apparatus configures a multi-projection system, the first projection apparatus comprising: an edge blending unit configured to perform edge blending processing on a region overlapping with a projection image projected by the second projection apparatus; a changing unit configured to change image gain properties of the edge blending processing by the edge blending unit successively, the image gain properties being provided such that a sum of image gain of a projection image projected by the first projection apparatus and image gain of a projection image projected by the second projection apparatus is constant throughout an entire image; and a synchronous control unit configured to perform synchronous control of changing of the image gain properties by the changing unit, between the first projection apparatus and the second projection apparatus.

Also, according to a second aspect of the present invention, there is provided a multi-projection system including a first projection apparatus and a second projection apparatus, the first projection apparatus and the second projection apparatus respectively comprising: an edge blending unit configured to perform edge blending processing on an overlapping region of a projection image; a changing unit configured to successively change image gain properties of the edge blending processing by the edge blending unit, the image gain properties being provided such that a sum of image gain of a projection image projected by the first projection apparatus and image gain of a projection image projected by the second projection apparatus is constant throughout an entire image; and a synchronous control unit configured to perform synchronous control of changing (switching) of the image gain properties by the changing unit, between the first projection apparatus and the second projection apparatus; wherein the changing unit of the first projection apparatus uses image gain properties for a master projection apparatus, the synchronous control unit of the first projection apparatus outputs, to the second projection apparatus, a synchronization signal for changing the image gain properties, the changing unit of the second projection apparatus uses image gain properties for a slave projection apparatus, and the synchronous control unit of the second projection apparatus changes the image gain properties synchronously with a synchronization signal that can be input from the first projection apparatus.

According to the present invention, in a multi-projection system employing a projection apparatus using a PWM driving scheme and having a liquid crystal display element, it is possible to reduce image degradation due to disclination in an edge blending region, and obtain a good image.

Further features of the present invention will become apparent from the following description of exemplary embodiments with reference to the attached drawings.

BRIEF DESCRIPTION OF THE DRAWINGS

FIG. 1 shows the overall configuration of a front projector of the present embodiment.

FIG. 3 is a flowchart of the present embodiment.

FIG. 4A shows edge blending in multi-projection by two projectors.

FIG. 4B shows edge blending in multi-projection by two projectors.

FIG. 6B shows an example regarding FIG. 5C where specific numerical values are additionally used.

FIG. 7A shows how disclination becomes easily visually recognized due to gradation processing in an overlapping region.

FIG. 7B shows how disclination becomes easily visually recognized due to gradation processing in an overlapping region.

FIG. 8 illustrates a relationship between an edge blending synchronization signal and a set of correction values.

DESCRIPTION OF THE EMBODIMENTS

First Embodiment

Overall Configuration

Figure 11:
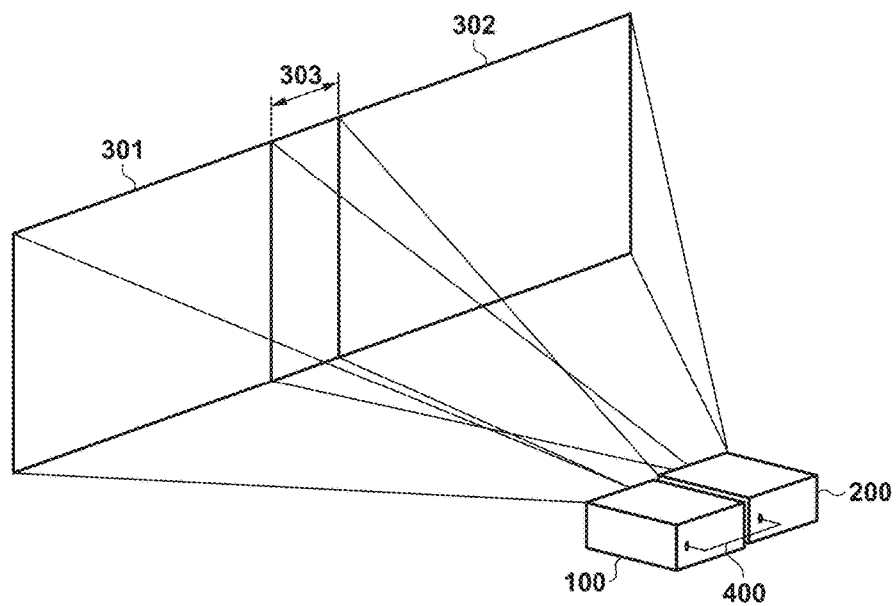
FIG. 11 illustrates multi-projection by two projectors.

FIG. 11 illustrates a multi-projection system employing two projectors, i.e., projection apparatuses. Here, a first front projector 100 projects a projector image 301, and a second front projector 200 projects a projector image 302, onto a screen. The two projector images overlap in an overlapping region 303 and are projected so as to be synchronized with each other. These two front projectors each have the configuration shown in FIG. 1. In this example, video data (or a video signal) that each projector projects, including the overlapping region, is input to each projector.

Next is a description of the overall configuration of a front projector of the present embodiment, with reference to FIG. 1.

FIG. 1 shows the overall configuration of the front projector 100 of the present embodiment.

The front projector 100 of the present embodiment has a CPU 110, a ROM 111, a RAM 112, an operation unit 113, an image input unit 130, and a projection image processing unit 140. The front projector 100 additionally has a liquid crystal control unit 150, liquid crystal elements (liquid crystal panels) 151R, 151G, and 151B, a light source control unit 160, a light source 161, a color separation unit 162, a color compositing unit 163, an optical system control unit 170, a projection optical system 171, a communications unit 180, a display control unit 195, a display unit 196, and an internal bus 199 connecting these functional blocks.

The projector 100 additionally has an edge blending coefficient generation unit 181 and an edge blending synchronization unit 182.

The CPU 110 controls each operation block of the front projector 100, the ROM 111 stores a control program describing a processing procedure of the CPU 110, and the RAM 112 serves as a work memory that temporarily stores a control program or data. Also, the CPU 110 temporarily stores still image data or moving image data that was received from the image input unit 130 or the communications unit 180, and by using a program stored in the ROM 111, also can reproduce respective images or video.

The operation unit 113 receives an instruction from a user and transmits an instruction signal to the CPU 110, and is configured with, for example, a switch, a dial, a touch panel provided on the display unit 196, or the like. Also, the operation unit 113 may be, for example, a signal receiving unit (such as an infrared receiving unit) that receives a signal from a remote control, and may be configured to transmit a predetermined instruction signal to the CPU 110 based on the received signal. Also, the CPU 110 receives a control signal that was input from the operation unit 113 or the communication unit 180, and controls each operation block of the front projector 100.

The projection image processing unit 140 performs change processing on the video signal received from the image input unit 130 to change a frame quantity, a pixel quantity, an image shape, or the like, and transmits the processed video signal to the liquid crystal control unit 150, and is configured with an image processing microprocessor or the like. The projection image processing unit 140 is not required to be a dedicated microprocessor, and for example, the CPU 110 may execute similar processing as the projection image processing unit 140 according to a program stored in the ROM 111. The projection image processing unit 140 can execute functions such as frame thinning processing, frame interpolation processing, resolution conversion (scaling) processing, and distortion correction processing (keystone correction processing). Also, in addition to a video signal that was received from the video input unit 130, the projection image processing unit 140 can also apply the above-described change processing to an image or video that has been reproduced by the CPU 110.

Figure 2A:
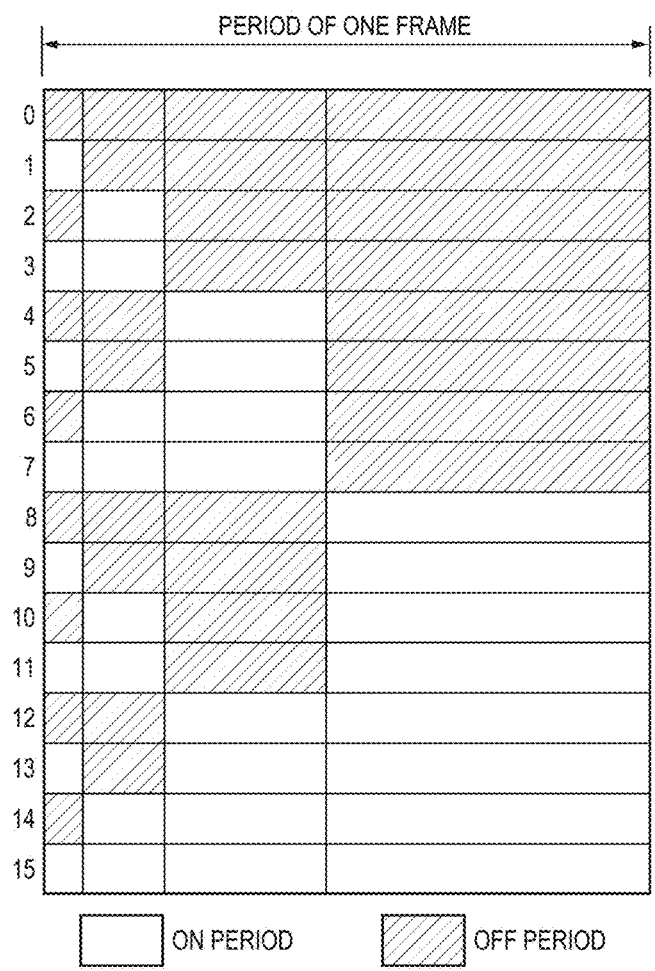
FIG. 2A shows expression of gradation in a liquid crystal panel employing PWM driving.
Figure 2B:
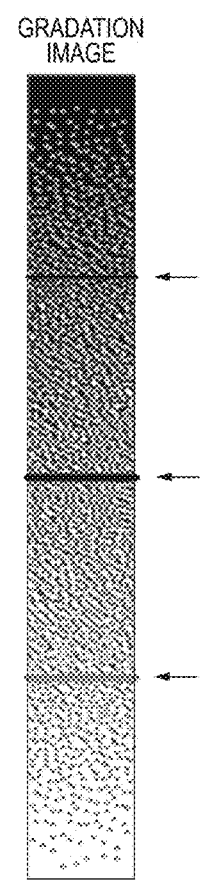
FIG. 2B shows expression of gradation in a liquid crystal panel employing PWM driving.

The liquid crystal control unit 150 controls a time period for applying a voltage to liquid crystals of pixels of the liquid crystal elements 151R, 151G, and 151B based on a video signal that has been processed by the projection image processing unit 140, and adjusts the time period of transmittance of the liquid crystal elements 151R, 151G, and 151B. This adjustment is as described with reference to FIGS. 2A and 2B. In other words, the liquid crystal control unit 150 is a driving circuit that performs PWM control of the liquid crystal elements. The liquid crystal element 151R is a liquid crystal element corresponding to the color red, and of light that has been output from the light source 161, among light that has been separated into the colors red (R), green (G), and blue (B) by the color separation unit 162, is configured to adjust the transmittance of light of the color red. The liquid crystal element 151G is a liquid crystal element corresponding to the color green, and of light that has been output from the light source 161, among light that has been separated into the colors red (R), green (G), and blue (B) by the color separation unit 162, is configured to adjust the transmittance of light of the color green. The liquid crystal element 151B is a liquid crystal element corresponding to the color blue, and of light that has been output from the light source 161, among light that has been separated into the colors red (R), green (G), and blue (B) by the color separation unit 162, is configured to adjust the transmittance of light of the color blue. An image corresponding to an image signal is optically reproduced by the liquid crystal elements.

The light source control unit 160 controls ON/OFF of the light source 161 and controls the light amount, and is configured with a control microprocessor. The light source control unit 160 is not required to be a dedicated microprocessor, and for example, the CPU 110 may execute similar processing as the light source control unit 160 according to a program stored in the ROM 111. The light source 161 outputs light for projecting an image on an unshown screen, and may be a halogen lamp, a xenon lamp, a high pressure mercury lamp, or the like, for example. The color separation unit 162 separates the light that has been output from the light source 161 into the colors red (R), green (G), and blue (B), and is configured with a dichroic mirror, a prism, or the like, for example. Note that when LEDs or the like corresponding to each color are used as the light source 161, the color separation unit 162 is unnecessary. The color compositing unit 163 composites light of the colors red (R), green (G), and blue (B) transmitted through the liquid crystal elements 151R, 151G, and 151B, and is configured with a dichroic mirror, a prism, or the like, for example. Then, light in which the colors red (R), green (G), and blue (B) have been composited by the color compositing unit 163 is sent to the projection optical system 171. At this time, the liquid crystal elements 151R, 151G, and 151B are controlled by the liquid crystal control unit 150 such that there is transmittance of light corresponding to the image that was input from the projection image processing unit 140. Therefore, when the light that has been composited by the color compositing unit 163 is projected on the screen by the projection optical system 171, an image corresponding to the image that has been input by the projection image processing unit 140 is displayed on the screen.

The optical system control unit 170 controls the projection optical system 171, and is configured with a control microprocessor. The optical system control unit 170 is not required to be a dedicated microprocessor, and for example, the CPU 110 may execute similar processing as the optical system control unit 170 according to a program stored in the ROM 111. The projection optical system 171 projects composited light that has been output from the color compositing unit 163 onto a screen, and is configured with a plurality of lenses and lens driving actuators, and by driving the lenses with the actuators, it is possible to perform enlargement, reduction, focus adjustment, or the like of a projection image.

The communications unit 180 receives a control signal, still image data, moving image data, or the like from an external device, and the communications scheme is not particularly limited. For example, a wireless LAN, a wired LAN, USB, Bluetooth (registered trademark), or the like may be used. Further, if a terminal of the image input unit 130 is, for example, an HDMI (registered trademark) terminal, CEC communications may be performed through that terminal. Here, as long as it is possible to perform communications with the front projector 100, the external device may be any sort of device such as a personal computer, a camera, a mobile phone, a smartphone, a hard disk recorder, a game machine, a remote control, or the like. In addition, in the present embodiment, the external device may be another front projector 100 for performing multi-projection. In this case, through the communications unit 180, it is possible to transmit a corrected synchronization signal or the like described later from one projector to another projector, or from an unshown control device to two projectors. In this configuration, image signal input may be performed using the image input unit 130.

The display control unit 195 performs control to display an image such as an operation screen for operating the front projector 100 or an image such as a switch icon in the display unit 196 provided in the front projector 100, and is configured with a microprocessor or the like that performs display control. A dedicated microprocessor for the display control unit 195 is not required, and for example, the CPU 110 may execute similar processing as the display control unit 195 according to a program stored in the ROM 111. Also, the display unit 196 displays an operation screen and a switch icon for operating the front projector 100. As long as the display unit 196 can display an image, any configuration may be adopted for the display unit 196. For example, the display unit 196 may be a liquid crystal display, a CRT display, an organic EL display, or an LED display. Also, in order to present a specific button in a recognizable manner to the user, LEDs or the like corresponding to respective buttons may be caused to emit light.

Note that the projection image processing unit 140, the liquid crystal control unit 150, the light source control unit 160, the optical system control unit 170, and the display control unit 195 of the present embodiment may be a single microprocessor or a plurality of microprocessors capable of performing similarly processing as each of these blocks. Also, for example, the CPU 110 may execute similar processing as each block according to a program stored in the ROM 111. Note that the video signal to be projected by each projector is divided for each projector when the video signal is input. The video signal, for example, is digital data that has been divided into frames by a vertical synchronization signal and divided into lines by a horizontal synchronization signal, and is stored in a frame buffer secured in the RAM 112, for example. A plurality of frame buffers may be prepared as necessary. Edge blending processing is performed on image data that has been stored in the frame buffers, for example.

Projection Control Processing

Figure 10:
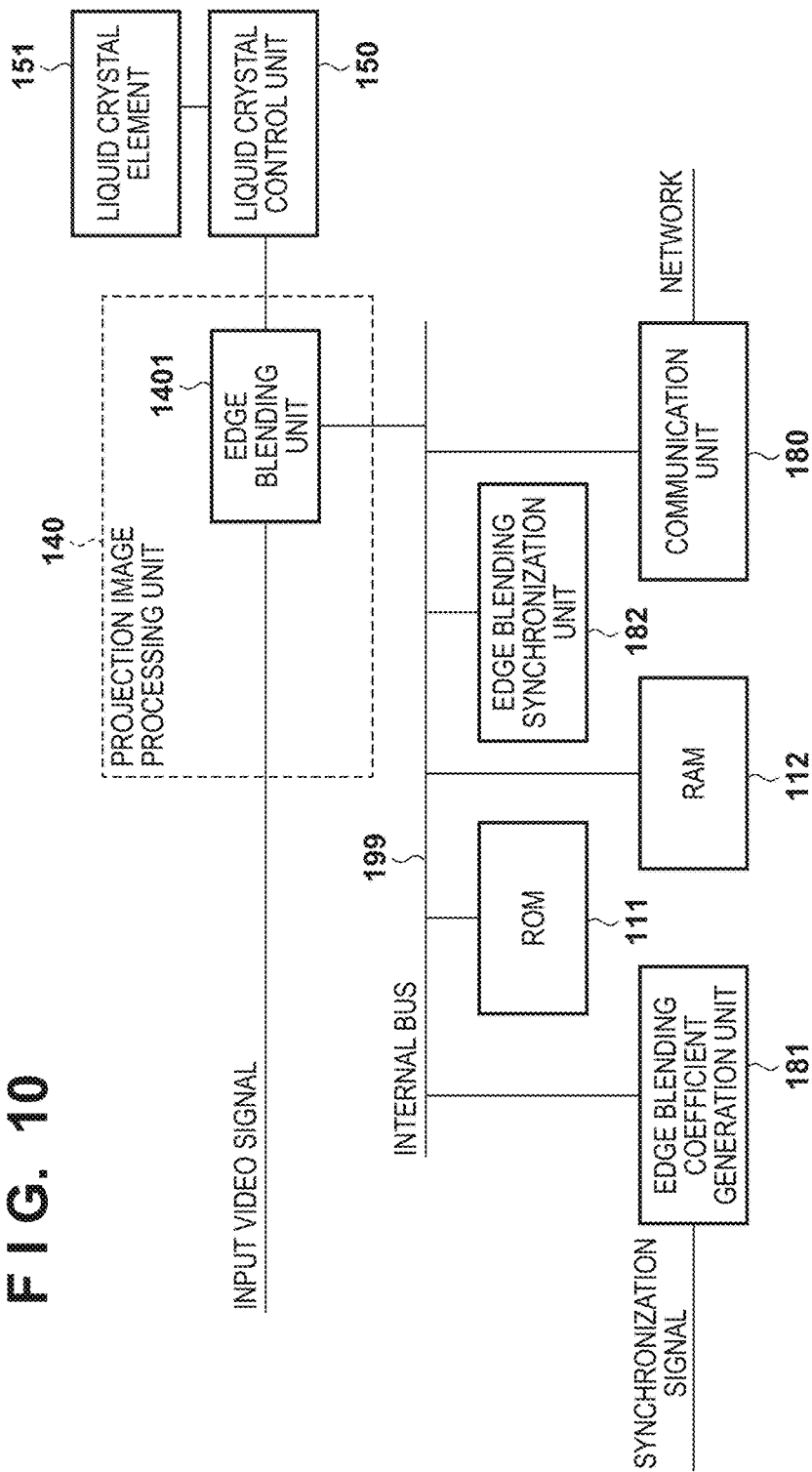
FIG. 10 is a block diagram of the present invention.

FIG. 10 is a block diagram centered on the projection image processing unit 140 shown in FIG. 1. The projection image processing unit 140 includes an edge blending unit 1401. In the first projector 100 and the second projector 200, images obtained by dividing an original image for each projector to project, and respectively including an overlapping region 303, are input from the image input unit 130 of each projector. Also, the two projectors are configured to be connected through the communications unit 180 of each projector.

FIG. 3 is a flow chart of the present embodiment, and shows a procedure executable by the projection image processing unit 140 of each of the first projector 100 and the second projector 200. Note that this procedure may also be executed by the CPU 110 rather than the projection image processing unit 140.

Step S301 is the start of image correction processing in the present embodiment. For example, execution is started from step S301 after power of the projector is turned on and initialization processing and the like have been completed. In step S302, it is determined whether or not there is a request to perform multi-projection by a plurality of projectors including the projector itself performing processing. Requests of a plurality of projectors are generated, for example, by an instruction from an unshown computer or by a switch operation provided in the operation unit 113, and occurrence of such a request can be detected by, for example, an interruption or a test of a value of a predetermined storage region. If there is no request for a plurality of projectors, the procedure returns to step S302. If there is a request for a plurality of projectors, the procedure moves to step S303 and requests setting of the projection conditions.

In step S303, projection conditions are requested. The projection conditions include projector arrangement/projection information such as, for example, the following sort of conditions.

(1) How many projectors are used to configure a projection image? In other words, the quantity of projectors that project one image that has been divided.

(2) Which projector projects which region of a composited projection image. In other words, assignment of an image region to a projector.

(3) In a projection image of a projector, which edge is set for edge blending. In other words, the edge of a screen to set for edge blending.

(4) The position of the overlapping region where projection images overlap, and the address of the compositing region to be subjected to edge blending processing.

(5) Shape of a gain curve in the compositing region of the projection image. In other words, properties of image gain in the compositing region. The image gain properties can be provided by, for example, a coefficient table, a function, or the like.

Note that in this example, the video signal to be input to each projector has already been divided, so if each projector knows at least the projection conditions (4) and (5), projection of the assignment region and necessary edge blending can be performed. Note that a configuration can also be adopted in which a video signal before division is input to each projector, the region to be projected is extracted from that video signal by each projector, and each projector projects the extracted region. In that case, condition (2) is also required for frame extraction.

Here, FIGS. 4A and 4B show the overlapping region 303 and image compositing when performing multi-projection by the first projector 100 and the second projector 200, and projection condition will be described with reference to these drawings. FIG. 4A shows the projection position of each projection image on the projection plane and the gain in gain control to the projection image of each projector in the overlapping region 303 of the projection images. This shows multi-projection being performed with two projectors, the first projector 100 and the second projector 200. Also, this shows that the first projector 100 projects the image on the left side of the multi-projection image and the second projector 200 projects the image on the right side. Because the first projector 100 projects the image on the left side, for this projector the overlapping region is set to the edge on the right side. Also, because the second projector 200 projects the image on the right side, for this projector the overlapping region is set to the edge on the left side. Here, the overlapping region 303 is defined as a region where projection images of each projector are overlapped in order to perform multi-projection. Also, a compositing region is defined as a region where gain of respective projection images is controlled in order to smoothly perform compositing of projection images with each other. In order to smoothly composite images with each other in the compositing region, in this example from left to right, projector 1 image gain is controlled from 1 to 0 and projector 2 image gain is controlled from 0 to 1. In other words, in the compositing region, the image gain on the side of the edge of the image to be projected is 0, and the image gain on the other side is a value equal to the image gain of the image except for the compositing region, i.e., a value of 1. By performing control such that in any position, summing the projector 1 image gain and the projector 2 image gain results in a value of 1, images can be composited smoothly without causing a brightness level difference to occur. Commonly, in multi-projection, the overlapping region 303 where the projector 1 image and the projector 2 image overlap is the compositing region for smoothly compositing the images.

FIG. 4B shows images of the first projector 100 and the second projector 200 respectively, on which independent gain control has been performed, and image gain properties. Here, in the projector 1 image gain, the gain is 1 at the projector 1 compositing start address, the gain is 0 at the projector 1 compositing end address, and the gain therebetween is set to be linear. Also in the projector 2 image gain, the gain is 0 at the projector 2 compositing start address, the gain is 1 at the projector 2 compositing end address, and the gain therebetween is set to be linear. Here, the image gain properties in the compositing region are linear with respect to the position in the horizontal direction. However, the image gain properties in the compositing region are not limited to being linear, and as described with reference to FIG. 4A, as long as summing the projector 1 image gain and the projector 2 image gain at any position results in a value of 1, properties such as those of a quadratic curve, a cubic curve, or the like may be used.

In step S304, it is determined whether or not the setting values of the projection conditions have been input to the corresponding projector. The projection conditions subject to the determination include at least conditions that can specify the region assigned to each projector and the parameters of edge blending, for example such as the conditions (4) and (5). If such projection conditions have not been input, the procedure returns to step S303. If input has completed, the procedure proceeds to step S305.

In step S305, input of the settings values of the projection conditions for multi-projection has already been completed in the projectors (abbreviated as PJ in FIG. 3), so projection images where gain control reflecting the settings values has been performed are projected from the projectors. While measuring and observing these projection images, the operator performs position matching of the projection images of the two projectors here. Here, as shown in FIG. 4A, the operator controls zooming, optical shift, setting position, and the like of the optical system such that the positions of the compositing start address and the compositing end address of each projection image by the first projector 100 and the second projector 200 overlap, thus matching the positions of the projection images. When doing so, in the first projector 100 and the second projector 200, position matching by the operator may be assisted by outputting a marker image at the positions of the compositing start address and the compositing end address of the video signal to be projected.

In step S306, it is determined whether or not the corresponding projector has been designated as the master projector from the operator. If the corresponding projector has been designated as the master projector, the procedure moves to step S307, and if the corresponding projector has not been specified as the master projector, the procedure moves to step S308. For example, one of two projectors that project two frames sharing one overlapping region in a certain direction is specified as a master projector, i.e., a master projection apparatus, and the other is a slave projector, i.e., a slave projection apparatus. The designation of the master projector may, for example, be performed explicitly by operation of the operation unit 113, or for example, a projector or the like to which a specific region has been assigned may implicitly be the master projector. Note that in a case where each region obtained by dividing the original image into the vertical direction and the horizontal direction has been assigned to a plurality of projectors, it is possible that overlapping regions overlap each other, and four overlapping regions overlap at the corner of a frame. In this case as well, edge blending processing may be performed on one overlapping region with the master projector and the slave projector related to that overlapping region in synchronization, and may be performed independently from processing of another overlapping region that overlaps. In this case, one projector can serve as the master with respect to one overlapping region and as the slave with respect to the other overlapping region.

Step S307 is stated for a case where, in step S306, the first projector 100 that is the projector of the present description serves as the master projector and the second projector 200 that is another projector serves as the slave projector. In the first projector 100 that is the master projector, correction information for the master projector that is stored in advance in the ROM 111 is selected in the edge blending coefficient generation unit 181. This correction information may be prepared in advance and stored in the ROM 111, or may be generated when there is a request for multi-projection of the present invention and stored in the RAM 112. Also, correction information may be generated in real-time at the time of projection.

Description of Correction Information

Figure 5A:
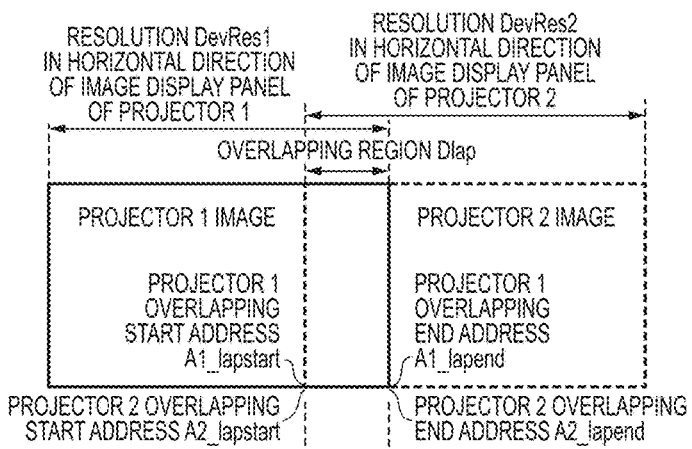
FIG. 5A shows overlapping regions and compositing regions of the present invention.

Corrections allowing degradation of image quality due to disclination in an embodiment of the present invention to be less visible, and correction information to accomplish this, will be described with reference to FIGS. 5A to 5D. FIG. 5A shows projection images when the first projector 100 and the second projector 200 are installed and set by the operator in step S305. Here,
the overlapping start address of the first projector 100 is represented by A1_lapstart,
the overlapping end address of the first projector 100 is represented by A1_lapend,
the overlapping start address of the second projector 200 is represented by A2_lapstart,
the overlapping end address of the second projector 200 is represented by A2_lapend,
the size of the overlapping region is represented by Dlap,
the horizontal length of the liquid crystal panel of the first projector 100 is represented by DevRes 1, and
the horizontal length of the liquid crystal panel of the second projector 200 is represented by DevRes 2.

Note that in this example, both the size and the address are in units of pixels. The address stated here is assumed to be an address of the frame buffer of each projector. Also, the address is a value focused only on the component in the direction of lining up the overlapping regions (the horizontal direction of the frames in FIGS. 5A to 5D). Therefore, if the regions are lined up vertically, this is a vertical direction component. In FIG. 5A, these values are already decided (set) in steps S303 and S304 at the time of installation and setting by the operator in step S305, or alternatively are fixed values.

Figure 5B:
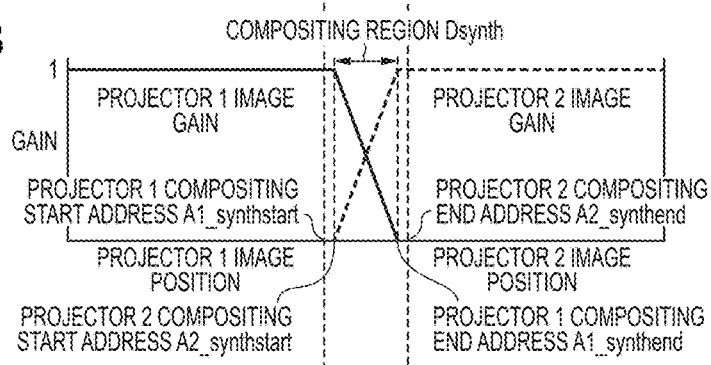
FIG. 5B shows overlapping regions and compositing regions of the present invention.
Figure 5C:
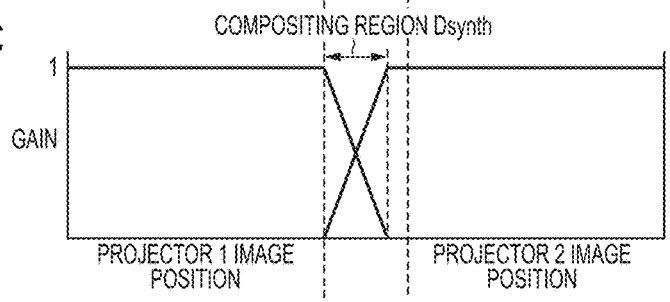
FIG. 5C shows overlapping regions and compositing regions of the present invention.
Figure 5D:
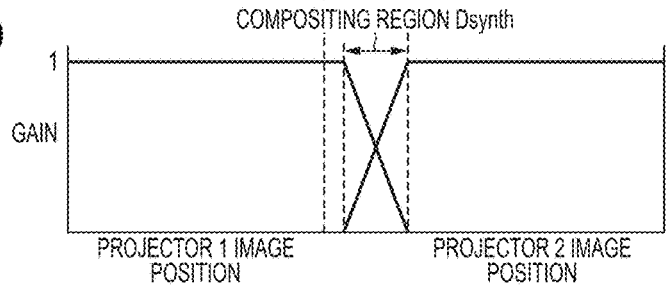
FIG. 5D shows overlapping regions and compositing regions of the present invention.

FIGS. 5B, 5C, and 5D show compositing regions and compositing addresses of the first projector 100 and the second projector 200. Here,
the compositing start address of the first projector 100 is represented by A1_synthstart,
the compositing end address of the first projector 100 is represented by A1_synthend,
the compositing start address of the second projector 200 is represented by A2_synthstart,
    the compositing end address of the second projector 200 is represented by A2_synthend, and
the size of the compositing region is represented by Dsynth.

These values also are set in steps S303 and S304, or alternatively are provided as fixed values. However, as described later, the compositing start address and the compositing end address are not fixed to a single value, but take values corresponding to each of a plurality of sets. Accordingly, addresses provided as fixed values are also different addresses for each of a plurality of sets. Also, in this example, even if the compositing start address and the compositing end address change, an expression of compositing end address−compositing start address="width of the compositing region" is set to a constant value, but this does not necessarily have to be a constant value.

The present embodiment is characterized by differing from the conventional edge blending processing when performing multi-projection in which image degradation due to disclination is not considered, in that the compositing region is narrower than the overlapping region and has a plurality of compositing start addresses and compositing end addresses as correction values, and the image gain properties corresponding to those correction values are successively changed (or periodically switched), for example, for each frame.

FIGS. 5B, 5C, and 5D each show a combination of a compositing start address and a compositing end address in which the compositing region Dsynth position differs within the range of the overlapping region Dlap. In this example, the compositing start address and the compositing end address each belong to three sets, and each set is applied by changing (or switching) the set for each frame. However, even if the compositing region Dsynth position of the projection images of the first projector 100 and the second projector 200 changes, the compositing image that is ultimately projected, shown in FIG. 5A, does not change.

Figure 6A:
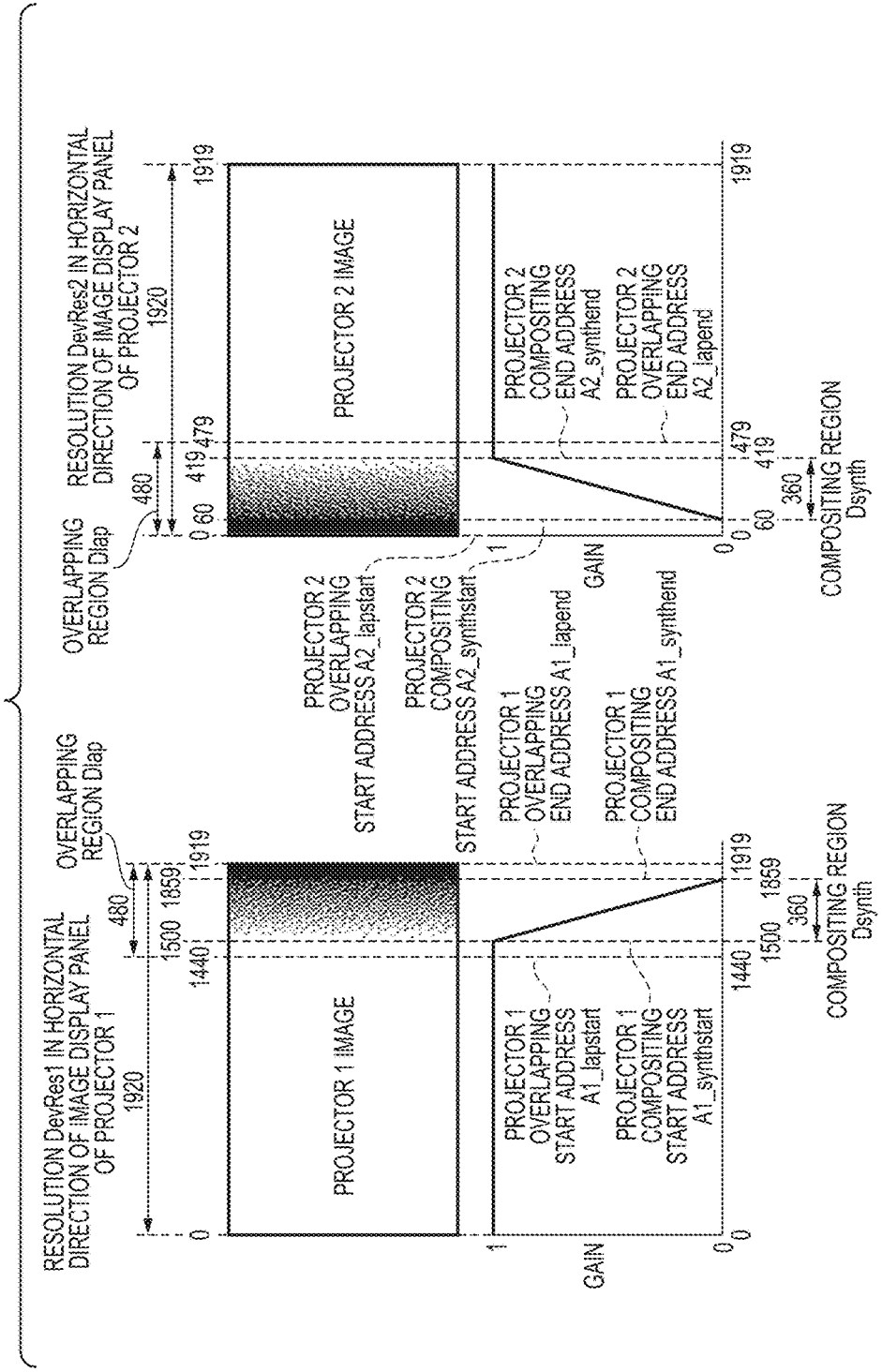
FIG. 6A shows an example regarding FIG. 5B where specific numerical values are additionally used.
Figure 6C:
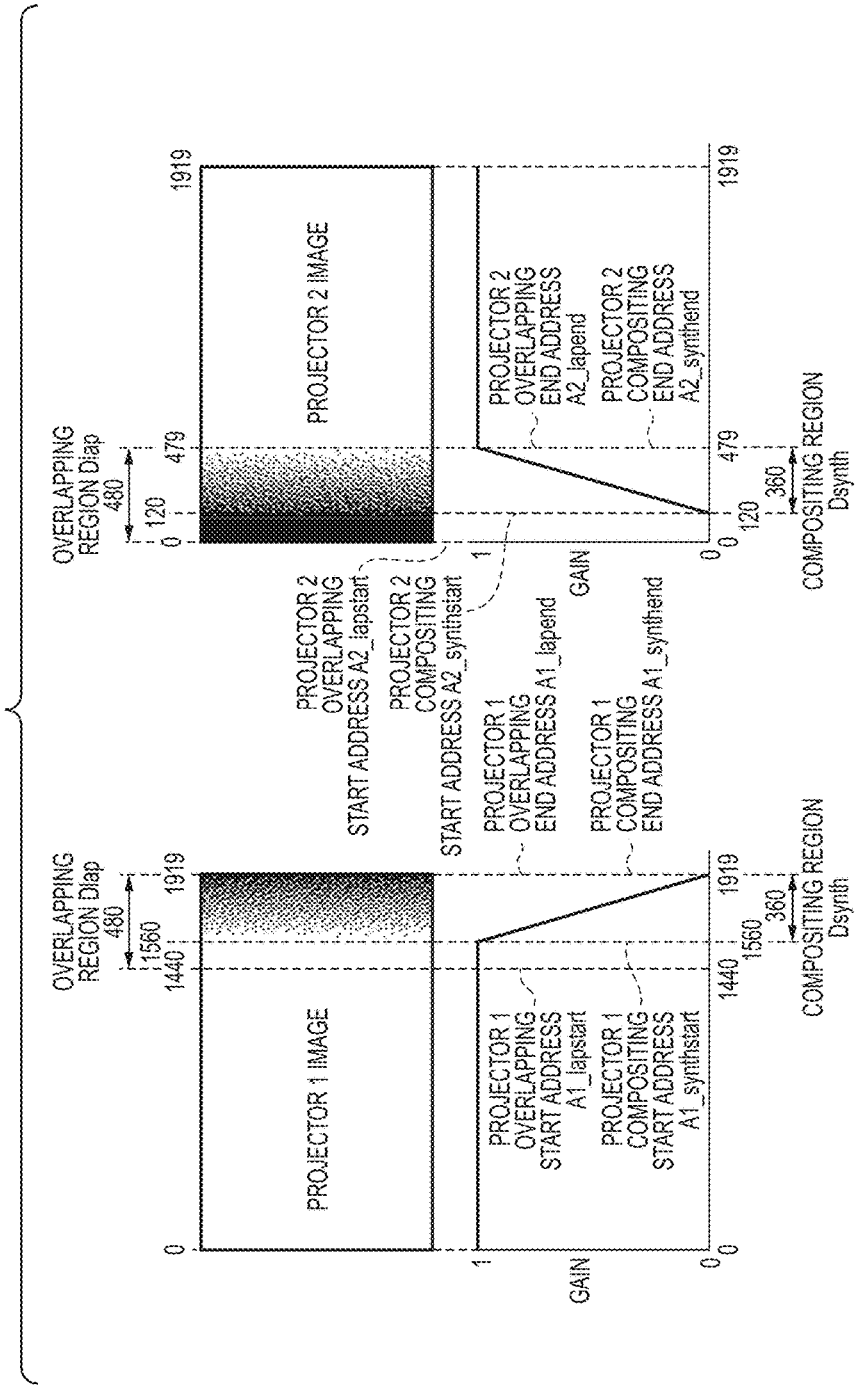
FIG. 6C shows an example regarding FIG. 5D where specific numerical values are additionally used.

FIGS. 6A to 6C illustrate a case regarding FIGS. 5A to 5D where specific numerical values are additionally used. The overlapping region Dlap and the compositing region Dsynth are known numerical values set in advance by the operator, and here the overlapping region Dlap=480 and the compositing region Dsynth=360. In multi-projection, the narrower the overlapping region Dlap, the greater the size of compositing image that can be projected. However, the overlapping region Dlap is a region for smoothly compositing the adjacent images with each other, and when the overlapping region Dlap is too narrow, the influence on the boundary with the adjacent image due to shaking of the projection image caused by shaking or vibration of the installed projector becomes relatively large, and so the boundary becomes easy to see. Therefore, the size of the overlapping region Dlap is decided (set) in consideration of the stability of the position where the projector is installed, and changes in that position over time. Commonly, the overlapping region Dlap is often set to about 10% to 30% of a length DevRes in the horizontal direction of the frame buffer. In the present embodiment, as an example, the length DevRes is set to 1920, and the overlapping region Dlap is set to 480, which is 25% of the length DevRes. Also, the compositing region Dsynth is set smaller than the overlapping region Dlap. Here, the compositing region Dsynth is set to 360, which is a size that is 75% of the overlapping region Dlap. In the present embodiment, the number of pixels in the horizontal direction of the liquid crystal panel is described as a resolution DevRes1=DevRes2=1920, which is the same as the length in the horizontal direction of the frame buffer for any projector.

Because the overlapping region Dlap, the compositing region Dsynth, and the projection position are already known, the projector 1 overlapping start address A1_lapstart, the projector 1 overlapping end address A1_lapend, the projector 2 overlapping start address A2_lapstart, and the projector 2 overlapping end address A2_lapend can be uniquely decided (set) from the following Expressions 1 to 4.

$$A1\_lapstart = DevRes1 - Dlap \quad \text{(Expression 1)}$$

$$A1\_lapend = DevRes1 - 1 \quad \text{(Expression 2)}$$

$$A2\_lapstart = 0 \quad \text{(Expression 3)}$$

$$A2\_lapend = Dlap - 1 \quad \text{(Expression 4)}$$

According to the numerical values calculated here, as described above, in step S305 the operator installs and sets the first projector 100 and the second projector 200. Then, regarding the projector 1 compositing start address A1_synthstart, the projector 1 compositing end address A1_synthend, the projector 2 compositing start address A2_synthstart, and the projector 2 compositing end address A2_synthend, which are the correction values of the present embodiment, if one of these four parameters has been determined, the other three parameters can be uniquely decided (set) according to the value of Dsynth. Calculation of the following correction values may be calculated in advance by the operator or may be calculated by the CPU 110.

First, the compositing start address A1_synthstart of the first projector 100 is decided (set) within the conditions of the following Expression 5.

$$A1\_lapstart \leq A1\_synthstart \leq (A1\_lapend - Dsynth) \quad \text{(Expression 5)}$$

At this time, as a method of deciding (setting) the projector 1 compositing start address A1_synthstart, for example, numerical values prepared in advance may be used, or this parameter may be determined using random numbers. If the projector 1 compositing start address A1_synthstart has been determined, the remaining values are calculated from the following Expressions 6 to 8.

$$A1\_synthend = A1\_synthstart + Dsynth - 1 \quad \text{(Expression 6)}$$

$$A2\_synthstart = A1\_synthstart - A1\_lapstart \quad \text{(Expression 7)}$$

$$A2\_synthend = A2\_synthstart + Dsynth - 1 \quad \text{(Expression 8)}$$

An example of each setting value including specific numerical values is shown in FIGS. 6A to 6C. In FIGS. 6A to 6C, as described above, the horizontal resolutions DevRes1 and DevRes2 of the panel are 1920 and the horizontal resolution of the overlapping region Dlap is 480. That is, in FIG. 5A, the horizontal resolutions of the image of the first projector 100 and the image of the projector 2 are 1920, the horizontal resolution of the overlapping region is 480, and the horizontal resolution of the projection compositing image is 3360, calculated from (DevRes×2−Dlap). FIG. 6A shows a specific example corresponding to FIG. 5B, FIG. 6B shows a specific example corresponding to FIG. 5C, and FIG. 6C shows a specific example corresponding to FIG. 5D. As described above, in this way a plurality of correction values for the first projector 100 and the second projector 200 including the compositing start address and the compositing end address are generated as one set. This may be calculated using a PC (Personal Computer) or the like, or may be calculated by the edge blending coefficient generation unit 181.

That is, in FIG. 6A,
Projector 1 compositing start address A1_synthstart=1500
Projector 1 compositing end address A1_synthend=1859
Projector 2 compositing start address A2_synthstart=60
Projector 2 compositing end address A2_synthend=419 in FIG. 6B,
Projector 1 compositing start address A1_synthstart=1440
Projector 1 compositing end address A1_synthend=1799
Projector 2 compositing start address A2_synthstart=0
Projector 2 compositing end address A2_synthend=359 and in FIG. 6C,
Projector 1 compositing start address A1_synthstart=1560
Projector 1 compositing end address A1_synthend=1919
Projector 2 compositing start address A2_synthstart=120
Projector 2 compositing end address A2_synthend=479.

Although generation of three correction value sets in FIGS. 6A to 6C has been described, the quantity of correction value sets may be three or more.

The correction values generated in this way may be stored in advance in the ROM 111, or may be generated and stored in the RAM 112 when there is a request for projection by a plurality of projectors according to the present invention. These items of correction information may be calculated by the first projector 100 serving as the master projector and distributed to the second projector 200 through the communications unit 180, or may be calculated in advance using an unshown external device such as a PC connected to the communication unit 180, and distributed to the first projector 100 and the second projector 200.

Continued Description of FIG. 3

In step S307, among the correction values that have been thus generated and stored in the ROM 111 or the RAM 112, a correction value set for the master projector is selected. That is, the projector 1 compositing start address A1_synthstart and the projector 1 compositing end address A1_synthend are selected. In step S308, among the correction values that have been generated as described in step S307 and stored in the ROM 111 or RAM 112 in advance, a correction value set for the slave projector is selected. That is, the projector 2 compositing start address A2_synthstart and the projector 2 compositing end address A2_synthend are selected. In step S309, the master projector generates an edge blending synchronization signal, which is a reference timing in the edge blending synchronization unit 182, and transmits this signal to the second projector 200 serving as a slave projector through the communication unit 180 of the master projector. Here, the edge blending synchronization signal indicates a combination of correction values to be applied to the image that each projector projects. In step S310, when the projector performing the procedure is a slave projector, this projector receives the edge blending synchronization signal from the master projector through this slave projector's own communications unit 180. Here, this projector serves as the second projector 200.

In step S311, in the first projector 100 serving as the master projector, based on the edge blending synchronization signal generated by the edge blending synchronization unit 182, the correction values stored in the ROM 111 or the RAM 112 of this projector are changed (or switched) for each frame. In the second projector 200 serving as the slave projector, based on the edge blending synchronization signal received from the first projector 100 serving as the master projector through the communications unit 180, the correction values stored in the ROM 111 or the RAM 112 of this projector are changed (or switched) for each frame. For example, when three sets of correction values have been generated as described with reference to FIGS. 5B, 5C, and 5D, in the first projector 100 serving as the master projector and the second projector 200 serving as the slave projector, correction values are changed (or switched) among these three sets in accordance with the edge blending synchronization signals. For example, a frame number is assigned beginning from 0, the frame number is grouped by remainder with the quantity of sets of correction values as divisor, and edge blending is performed using the same set of correction values for each group. For example, if there are three sets of correction values as in FIGS. 5B, 5C, and 5D, the remainder is some number among 0, 1, and 2. If frames belonging to groups having remainders of 0, 1, and 2 are respectively called frames n, n+1, and n+2, for example, the correction value set in FIG. 5B is changed (or switched) in frame n, the correction value set in FIG. 5C is changed (or switched) in frame n+1, the correction value set in FIG. 5D is changed (or switched) in frame n+2, and for subsequent frames, respective correction values are changed (or switched) while repeating these.

In step S312, edge blending processing is performed on the input video signal in the edge blending unit 1401 based on the correction values that have been changing (or switched) for each frame in S311. Here, the edge blending processing is processing to perform gain processing on the input image based on the compositing start address and the compositing end address, which are the correction values that have been changing (or switched) for each frame in step S311. In the gain processing, as described above, the master projector and the slave projector respectively apply the given gain properties to a section of image data from the compositing start address to the compositing end address, which can be designated with the set of correction values that were decided (set) in step S311. Note that for regions other than the compositing region, by setting the gain to 1, gain can be applied to all of the image data in a frame.

Synchronization of Correction Processing

FIG. 8 illustrates the relationship between the edge blending synchronization signals and the correction value sets. Operation from step S307 to step S312 will be described with reference to this drawing. Video signals to be projected by the first projector 100 and the second projector 200 are input to the projectors from the image input unit 130. The edge blending synchronization unit 182 of the first projector 100 and the second projector 200 generates an edge blending synchronization signal from a Vsync signal that has been input. The edge blending synchronization signal is a signal indicating which combination to select among the correction value sets stored in the ROM 111 or the RAM 112.

In frame n, the edge blending synchronization signal indicates a correction value 01. Then, in the first projector 100 serving as the master projector, in the edge blending coefficient generation unit 181, the correction value 01 for the first projector 100 is read from the ROM 111 or the RAM 112. Because one set of correction values includes values for a master and a slave, each projector reads a correction value according to its role. The first projector 100 is the master, so this projector reads the correction value of the master projector. Then, that correction value is set in the edge blending unit 1401. According to the correction value that has been set in the edge blending unit 1401, gain (i.e., the correction value for the pixel value) is applied according to the gain properties for the video signal that has been input. Specifically, here, the correction value is the projector 1 compositing start address A1_synthstart and the projector 1 compositing end address A1_synthend, and until the address of the input video signal changes from the projector 1 compositing start address A1_synthstart to the projector 1 compositing end address A1_synthend, gain control is performed on the input video signal according to the predetermined gain properties as indicated by the projector 1 image in FIG. 6A. Note that in this example, because the gain properties are linear, it is possible to decide (set) the gain by linearly interpolating the gain for pixels at each address from the compositing start address and the compositing end address. Therefore, although the compositing start address and the compositing end address are called correction values, if the gain is not linear, the correction values can include gain properties in addition to an address indicating the compositing region.

In the second projector 200 serving as the slave projector, the edge blending synchronization signal generated by the edge blending synchronization unit 182 of the first projector 100 is received with the communication unit 180 of the second projector 200 through the communications unit 180 of the projector 1 and a communications cable 400. The edge blending synchronization signal received with the communications unit 180 of the second projector 200, in the edge blending coefficient generation unit 181 of the second projector 200, reads the correction values for the second projector 200 from the ROM 111 or the RAM 112. The second projector 200 is the slave, so this projector reads the correction value of the slave projector. Then, that correction value is set to the edge blending unit 1401 of the second projector 200. Gain is applied to the video signal that has been input according to the correction values that have been set in the edge blending unit 1401. Specifically, here, the correction value is the projector 2 compositing start address A2_synthstart and the projector 2 compositing end address A2_synthend, and until the address of the input video signal changes from the projector 2 compositing start address A2_synthstart to the projector 2 compositing end address A2_synthend, gain control is performed on the input video signal as indicated by the projector 2 image in FIG. 6A.

In the frame n+1 that is the next frame, similarly, the correction value 02 is applied to each projector. That is, the gain properties shown in FIG. 6B are applied to the frame. In the frame n+2 that follows, the correction value 03 is applied. That is, the gain properties shown in FIG. 6C are applied to the frame. Subsequently, correction values are selected and applied according to the edge blending synchronization signal. When the edge blending synchronization signal repeats in a 3 frame period, FIGS. 6A to 6C are repeated in a 3 frame period.

In step S313, it is confirmed whether to end projection by a plurality of projectors. If not ending projection, the procedure returns to step S311. If ending projection, the procedure moves to step S314. In step S314, processing is ended.

As stated above, in the present embodiment, in the overlapping region of projection images in multi-projection, each projector sharing the overlapping region synchronizes and applies different compositing addresses for each frame. Thus, the compositing regions are allowed to change position in the spatial direction of the projection screens. As a result, the position where image disturbance occurs due to disclination caused by PWM driving of the liquid crystal panels is moved for each frame, and so a good image is obtained in which image disturbance is difficult to see.

Also, instead of changing the gain properties for each frame, the gain properties may be changed at an interval of a fixed quantity of frames. Also, image gain may be constant throughout an entire image projected by the multi-projection system. In the above example, gain is controlled with respect to both compositing regions and other regions so that gain is 1 throughout the entire image. However, even if gain is a value other than 1, if the gain is constant, the boundary of images between projectors can be made inconspicuous, and disclination can be prevented.

Second Embodiment

In the first embodiment, as the correction values, the compositing start address and the compositing end address are changed (or switched) for each frame, but a configuration may also be adopted in which, other than those addresses, the gain properties in the compositing region are different for each frame.

Figure 9A:
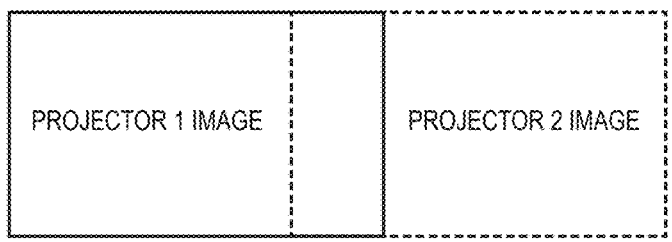
FIG. 9A illustrates a compositing region gain curve.
Figure 9B:
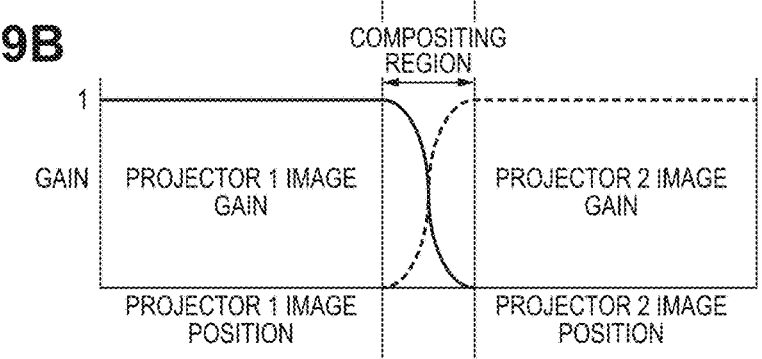
FIG. 9B illustrates a compositing region gain curve.
Figure 9C:
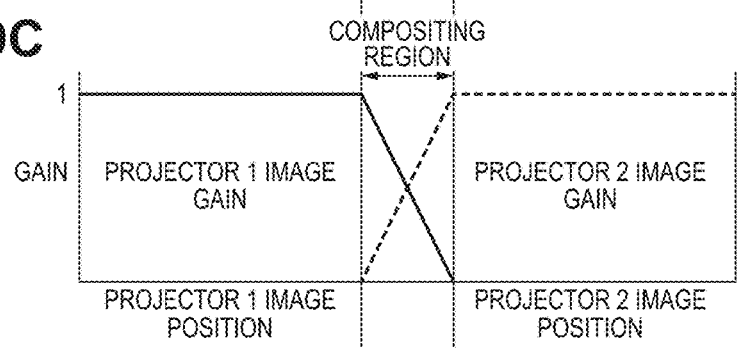
FIG. 9C illustrates a compositing region gain curve.
Figure 9D:
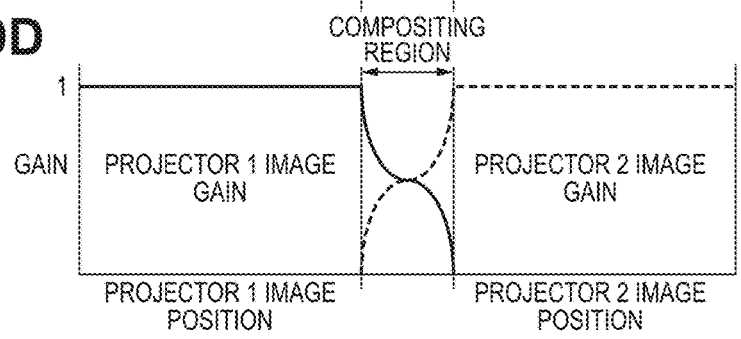
FIG. 9D illustrates a compositing region gain curve.

FIGS. 9A to 9D illustrate gain properties of the compositing region. Here, FIG. 9A shows a state of the projection image of the first projector 100 and the projection image of the second projector 200 overlapping each other. FIGS. 9B, 9C and 9D show the gain properties in respective frames. In the above description of the first embodiment, the correction values are the compositing start address and the compositing end address, but here the correction value is the gain properties of the compositing region. For gain properties in this compositing region, in FIGS. 9B, 9C, and 9D, in the compositing region of the projection images of the first projector 100 and the second projector 200, the summed value of the gain at the same position is 1 everywhere. These gain properties can be stored in the ROM 111 or the RAM 112. Then, as described in the above embodiment, the edge blending coefficient generation unit 181 selects the gain curve of FIG. 9B in frame n, selects the gain properties of FIG. 9C in frame n+1, and selects the gain properties of FIG. 9D in frame n+2, and sets them in the edge blending unit 1401, and therefore the same effects as in the above embodiment can be obtained. In this case, particularly in the case of FIGS. 9B and 9D, gain cannot be specified only by the start address and the end address of the compositing region, so gain is provided as a function or a table. Also, rather than applying each individually, a configuration may be adopted in which each of the compositing start address, the compositing end address, and the gain properties in the overlapping region or the compositing region are combined as items that are different for each frame, and applied in a combination.

As stated above, in the present embodiment, in the overlapping region of projection images in multi-projection, gain properties, which are compositing ratios of projection images that differ for each frame, are applied with each projection image synchronized. As a result, the position where image disturbance occurs due to disclination caused by PWM driving of the liquid crystal panels is moved for each frame, and so a good image is obtained in which image disturbance is difficult to see.

Other Embodiments

In the above embodiment, an example is described in which two projectors are disposed in the horizontal direction, and any of the left edge and the right edge of a screen overlaps. Here, the overlapping portion may span a plurality of screen locations. For example, the invention according to the present embodiment is also applicable to a multi-projection system having projectors disposed in two dimensions. In this case, at least any of the left edge and the right edge, and at least any of the upper edge and the lower edge, of a screen projected by a certain projector overlap the screen of another projector. The invention according to the present embodiment may also be applied to these overlapping portions. In this case, synchronous control is necessary for the overlapping portions between two projectors synchronizing gain properties, but synchronous control is not necessary for an image not synchronizing gain properties.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-087384, filed Apr. 25, 2016 which is hereby incorporated by reference herein in its entirety.

What is claimed is:

1. A first projection apparatus that together with a second projection apparatus are projection apparatuses of a multi-projection system with edge blending processing, the first projection apparatus comprising:
   a projection unit configured to project an image on a screen;
   at least one processor; and
   at least one memory storing at least one program which, when executed by the at least one processor, causes the first projection apparatus to:
   (1) acquire an input image;
   (2) set an image gain curve for an overlapping region of an input image, the image gain curve being used for overlapping, in the overlapping region, a first image projected by the first projection apparatus and a second image projected by the second projection apparatus; and
   (3) control the projection unit to project an image based on the input image in which the image gain curve is applied to the overlapping region,
   wherein the image gain curve is changed at an interval of a predetermined number of frames.

2. The first projection apparatus according to claim 1, wherein the image gain curve is changed such that at least one of (a) a position of a compositing region to be subjected to the edge blending processing, and (b) a shape of the image gain curve, changes.

3. The first projection apparatus according to claim 2, wherein the position of the compositing region to be subjected to the edge blending processing within the overlapping region is changed, and wherein the image gain curve is a curve such that the image gain at one edge of the compositing region is 0, and the image gain at another edge is a value equal to the image gain of the projection image other than in the compositing region, and the gain between the edges is provided linearly according to the gain of the edges.

4. The first projection apparatus according to claim 1, wherein the image gain curve is changed for each frame.

5. The first projection apparatus according to claim 1, wherein the projection unit includes:

a liquid crystal element configured to optically reproduce an image according to the input image; and a driving circuit configured to perform PWM control of the liquid crystal element.

6. The first projection apparatus according to claim 1, wherein the first projection apparatus and the second projection apparatus change respective image gain curves synchronously.

7. A multi-projection system with edge blending processing, the system including a first projection apparatus and a second projection apparatus, wherein each of the first projection apparatus and the second projection apparatus comprises:

a projection unit configured to project an image on a screen;

at least one processor; and at least one memory storing at least one program which, when executed by the at least one processor, causes the projection apparatus to:

(1) acquire an input image;

(2) set an image gain curve for an overlapping region of the input image, the image gain curve being used for overlapping, in the overlapping region, a first image projected by the first projection apparatus and a second image projected by the second projection apparatus; and (3) control the projection unit to project an image based on the input image to which the image gain curve is applied, wherein the image gain curve is changed at an interval of a predetermined number of frames, and wherein the first projection apparatus and the second projection apparatus change respective image gain curves synchronously.

8. A method of controlling a first projection apparatus that together with a second projection apparatus are projection apparatuses of a multi-projection system with edge blending processing, wherein the first projection apparatus comprises a projection unit configured to project an image on a screen, the method comprising:

acquiring an input image;

setting an image gain curve for an overlapping region of the input image, the image gain curve being used for overlapping, in the overlapping region, a first image projected by the first projection apparatus and a second image projected by the second projection apparatus;

outputting a synchronous signal which indicates the image gain curve set by the setting; and controlling the projection unit to project an image based on the input image to which the image gain curve is applied, wherein the image gain curve is changed at an interval of a predetermined number of frames.

9. A non-transitory computer-readable medium storing a program for, when executed, causing a computer, configured to control a first projection apparatus that together with a second projection apparatus are projection apparatuses of a multi-projection system with edge blending processing, to perform a method comprising:

acquiring an input image;

setting an image gain curve for an overlapping region of the input image, the image gain curve being used for overlapping, in the overlapping region, a first image projected by the first projection apparatus and a second image projected by the second projection apparatus; and controlling a projection unit to project an image on a screen based on the input image to which the image gain curve is applied, wherein the image gain curve is changed at an interval of a predetermined number of frames.

10. The first projection apparatus according to claim 1, wherein the at least one program, when executed by the at least one processor, further causes the first projection apparatus to output a synchronous signal corresponding to the image gain curve.

\* \* \* \* \*